United States Patent [19]

Laurent et al.

[11] 3,853,569

[45] Dec. 10, 1974

[54] SILICATE GLASS FIBER COMPOSITIONS

[75] Inventors: Bernard Laurent, Paris; Claude Haslay, Creil, both of France

[73] Assignee: Compagnie de Saint-Gobain, Neuilly sur Seine, France

[22] Filed: July 1, 1970

(Under Rule 47)

[21] Appl. No.: 51,672

Related U.S. Application Data

[63] Continuation-in-part of Ser. No. 341,417, Jan. 30, 1964, abandoned.

[30] Foreign Application Priority Data

Feb. 7, 1963   France .......................... 63.924011

[52] U.S. Cl. .................................. 106/50, 106/54
[51] Int. Cl. ...... C03c 3/08, C03c 3/30, C03c 13/00
[58] Field of Search ................................. 106/50, 54

[56] References Cited
UNITED STATES PATENTS 2,998,620   9/1961   Stalego .......................... 106/50 X
3,013,888   12/1961   de Lajarte .......................... 106/50

Primary Examiner—Winston A. Douglas
Assistant Examiner—Mark Bell
Attorney, Agent, or Firm—Synnestvedt & Lechner

[57] ABSTRACT

Glass composition and method, particularly adapted for use in forming glass fibers by centrifugal spinning. The glass is characterized by about 61 to 66.5% by weight $SiO_2$; 2 to 5% $Al_2O_3$; 0 to 1.5% F; 2 to 5% MgO; 1 to 5% $B_2O_3$; 0.1 to 2.75% BaO; 14 to 16% $Na_2O + K_2O$; 4 to 7.5% CaO; 0–2.5% $ZrO_2$; 0.2 to 1% $Fe_2O_3$, such that $0.30 < CaO/Na_2O + K_2O < 0.50$, and such that $BaO/CaO < 0.50$ and $0.5 < MgO/CaO < 0.7$. The glass has a fibering temperature of from 960° to 1,110° C. and high resistance to devitrification at these temperatures, thus enabling operation at temperatures materially lower than prior art.

2 Claims, No Drawings

SILICATE GLASS FIBER COMPOSITIONS

This application is a continuation-in-part of our copending application Ser. No. 341,417 filed Jan. 30, 1964, now abandoned.

This invention relates to special purpose glass and to a method of making glass fibers.

The manufacture of glass fibers by centrifugal spinning is a valuable process in which glass is melted in a furnace or a "bushing" and falls into the center or a rapidly rotating centrifuge having an exterior wall of foraminous structure the openings in which serve to form primary fibers which are ejected into a blast of flame and attenuated to form the final product. See U.S. Pat. No. Re 24,708. The rim wall of the centrifuge is usually provided with several, vertically and horizontally arranged rows of holes which are supplied with glass from a distributor within the centrifuge which receives the molten glass from the bushing and delivers it to the inner wall of the foraminous rim from whence it is ejected by centrifugal force through the holes.

The number of glasses which are satisfactory for this purpose is small. Among the problems which beset all glasses proposed for this use are those of viscosity, including the temperature at which the glass attains a useful viscosity, whether the viscosities are attainable at a satisfactory speed of rotation; and that of devitrification. Assuming that an operating temperature of 1,000° to 1,200° C. and speeds of 3,000 r.p.m. are technically satisfactory, the questions are whether a particular glass has a right viscosity and satisfactory resistance to devitrification at those temperatures and speeds. The vast majority of glasses do not.

The orifices of projection, the holes or spinnerettes in the wall of the centrifuge, are usually cooler at the bottom of the wall than at the top, and they have become obstructed unless the general temperature of the operation is raised to a point at which the glass flows freely at that level, which raises the temperature of operation and degrades and shortens the life of the apparatus, especially the expensive spinner, which is usually refractory steel.

It is an object of this invention to make novel glasses, a new family of glasses, which attain optimum viscosity and which have negligible speeds of devitrification under the conditions of operation existing in the manufacture of glass fibers by centrifugal methods.

The objects are accomplished, generally speaking, by a family of glasses as more fully hereinafter described, which are low in fluorine, high in alkali oxide, low in boric anhydride, and low in lime and magnesia.

The original description was written before the limites of constitution had been accurately established. In the meantime analysis and test results have shown that only the following compositions and proportions have the properties requisite to the satisfactory attainment of the objects of the invention:

| | | |
|---|---|---|
| $SiO_2$ | 61 –66.5 | % by weight |
| $Al_2O_3$ | 2 –5 | % by weight |
| F | 0 –1.5 | % by weight |
| MgO | 2 –5 | % by weight |
| $B_2O_3$ | 1 –5 | % by weight |
| BaO | 0.1 –2.75 | % by weight |
| $Na_2O+K_2O$ | 14 –16 | % by weight |
| CaO | 4 –7.5 | % by weight |
| $ZrO_2$ | 0 –2.5 | % by weight |
| $Fe_2O_3$ | 0.2 –1 | % by weight | in which the relations $.3 < CaO/Na_2O + K_2O < .5$ , and
$0 < BaO/CaO < .5$ , and
$.5 < MgO/CaO < .7$ The following compositions exemplify the invention withouot imposing limits other than as stated above: (percent by weight)

| Glass | Ex. 1 | Ex. 2 | Ex. 3 |
|---|---|---|---|
| $SiO_2$ | 66.45 | 63.90 | 61.00 |
| $Fe_2O_3$ | 0.38 | 0.30 | 0.30 |
| $Al_2O_3$ | 3.00 | 2.95 | 2.95 |
| CaO | 7.45 | 7.35 | 7.35 |
| MgO | 3.40 | 3.10 | 3.10 |
| BaO | 1.70 | 2.50 | 2.50 |
| $Na_2O$ | 14.30 | 14.10 | 14.40 |
| $K_2O$ | 1.15 | 0.80 | 0.50 |
| $B_2O_3$ | 1.05 | 5.00 | 4.90 |
| F | 1.05 | — | 1 |
| $O_2$ to be deducted | 0.44 | — | 0.42 |
| $ZrO_2$ | — | — | 2.50 |
| Viscosity n in poises — log. n: | | | |
| to 1000°C. | 3.62 | 3.45 | 3.44 |
| to 1050°C. | 3.38 | 3.13 | 3.10 |
| to 1100°C. | 3.01 | 2.85 | 2.79 |
| to 1200°C. | 2.55 | 2.37 | 2.29 |
| Devitrification | Ex. 1 | Ex. 2 | Ex. 3 |
| Upper limit | 950 | 940 | 940 |
| Temperature of the maximum | 840 | 810 | 830 |
| Rate of the maximum in microns/minute | 0.7 | 0.1 | 0.2 |

These glasses are low in boric anhydride and fluorine. Their maximum speed of devitrification is less than 2 microns/minute. The speed of devitrification corresponds to the greatest speed of crystal growth at a selected temperature. The temperature corresponding to a viscosity of 1,000 poises falls, for these glasses, between about 1,000° and 1,200° C. Thus, under the conditions of centrifugal spinning there is substantially no devitrification and the viscosity permits operations at temperatures substantially lower than those required by other glasses which have been used for this purpose.

These glasses are adapted to a wide variety of uses but their special properties adapt them exceptionally well to centrifugal spinning. In such apparatus the centrifuges or spinners, of refractory steel, have a longer life because of the relatively reduced temperatures at which the new glasses may be used. This fibering temperature of these glasses ranges from 1,100° C. down to about 960° C. Particular fields of operational efficiency are observed between 960° and 980° C.; between 1,030° and 1,050° C.; and between 1,080° and 1,100° C. Because of the high resistance to devitrification of these glasses the lower orifices in the wall of the spinner no longer become obstructed. In the prior art practice, the mean life of spinners in a particular installation for the manufacture of glass fibers was around 200 hours of operation, but this invention has increased it to about 300 to 330 hours of operation.

The composition of these glasses is such that their costs are less than the glasses which are in standard use.

In manufacturing the glasses the calcium oxide and magnesium oxide may be introduced as dolomite. Similarly the alumina and alkali metal oxides may be introduced as phonolite. The use of these raw materials has an exceptional advantage in facilitating the fusion of the glass.

It is to be noted that glass composition corresponding to Examples 1, 2 and 3 have very remarkable properties concerning the upper limit of the devitrification, and also the rate of the maximum speed of devitrifications in microns/minute. It is also to be noted that the viscosity of these three glasses is particularly low.

The temperature of the peripheral band of the centrifuging body used in our standard centrifugal spinning process varies slightly along the height of said band. The upper part of the peripheral band is usually at a temperature between 1020° and 1050°C. The lower part is usually at a temperature of 960° C. At the working temperatures, comprised between 960° and 1050° C. glass compositions corresponding to our Examples 1, 2 and 3 have a viscosity which is much lower than the viscosities of prior glasses.

This low viscosity is particularly advantageous and reduces the corrosion of the steels used for the manufacture of centrifuging bodies.

As many apparently widely different embodiments of the present invention may be made without departing from the spirit and scope thereof, it is to be understood that the invention is not limited to the specific embodiments.

What is claimed is:

1. A glass having the composition by weight percent:

| | |
|---|---|
| $SiO_2$ | 63.90 |
| $Fe_2O_3$ | 0.30 |
| $Al_2O_3$ | 2.95 |
| CaO | 7.35 |
| MgO | 3.10 |
| BaO | 2.50 |
| $Na_2O$ | 14.10 |
| $K_2O$ | 0.80 |
| $B_2O_3$ | 5.00 |

2. A glass having the composition by weight percent:

| | |
|---|---|
| $SiO_2$ | 61.00 |
| $Fe_2O_3$ | 0.30 |
| $Al_2O_3$ | 2.95 |
| CaO | 7.35 |
| MgO | 3.10 |
| BaO | 2.50 |
| $Na_2O$ | 14.40 |
| $K_2O$ | 0.50 |
| $B_2O_3$ | 4.90 |
| F | 1 |
| $O_2$ to be deducted | 0.42 |
| $ZrO_2$ | 2.50 |

* * * * *

UNITED STATES PATENT OFFICE
CERTIFICATE OF CORRECTION

Patent No. 3,853,569                    Dated Dec. 10, 1974

Inventor(s) Bernard Laurent and Claude Haslay

It is certified that error appears in the above-identified patent and that said Letters Patent are hereby corrected as shown below:

Col. 3, line 3, after "devitrification," insert --the temperature of the maximum of devitrification--

Assignee "Compagnie de Saint-Gobain" should read --Certain-teed Products Corporation--.

Signed and sealed this 8th day of April 1975.

(SEAL)
Attest:

RUTH C. MASON
Attesting Officer

C. MARSHALL DANN
Commissioner of Patents
and Trademarks